Oct. 19, 1948.  L. I. YEOMANS ET AL  2,451,899
TABLE DRIVE MECHANISM
Filed Dec. 26, 1942  3 Sheets-Sheet 3
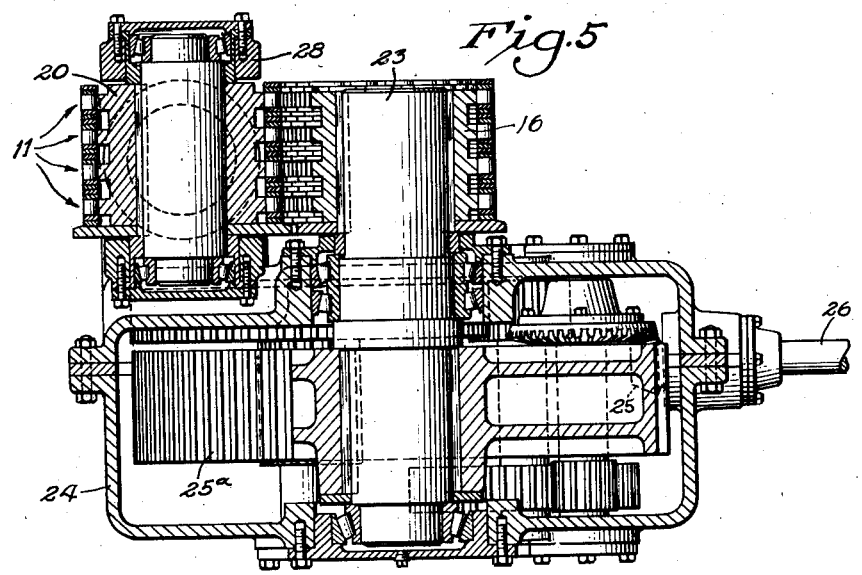
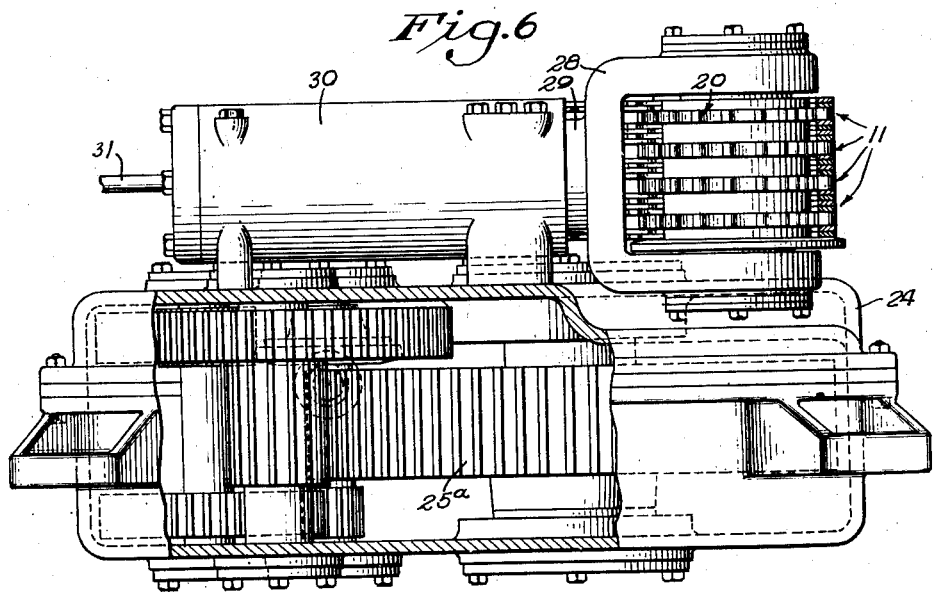
Inventor
Lucien I. Yeomans
DeWitt Clausen
By Parker, Carlson, Pitzner & Hubbard
Attorneys.

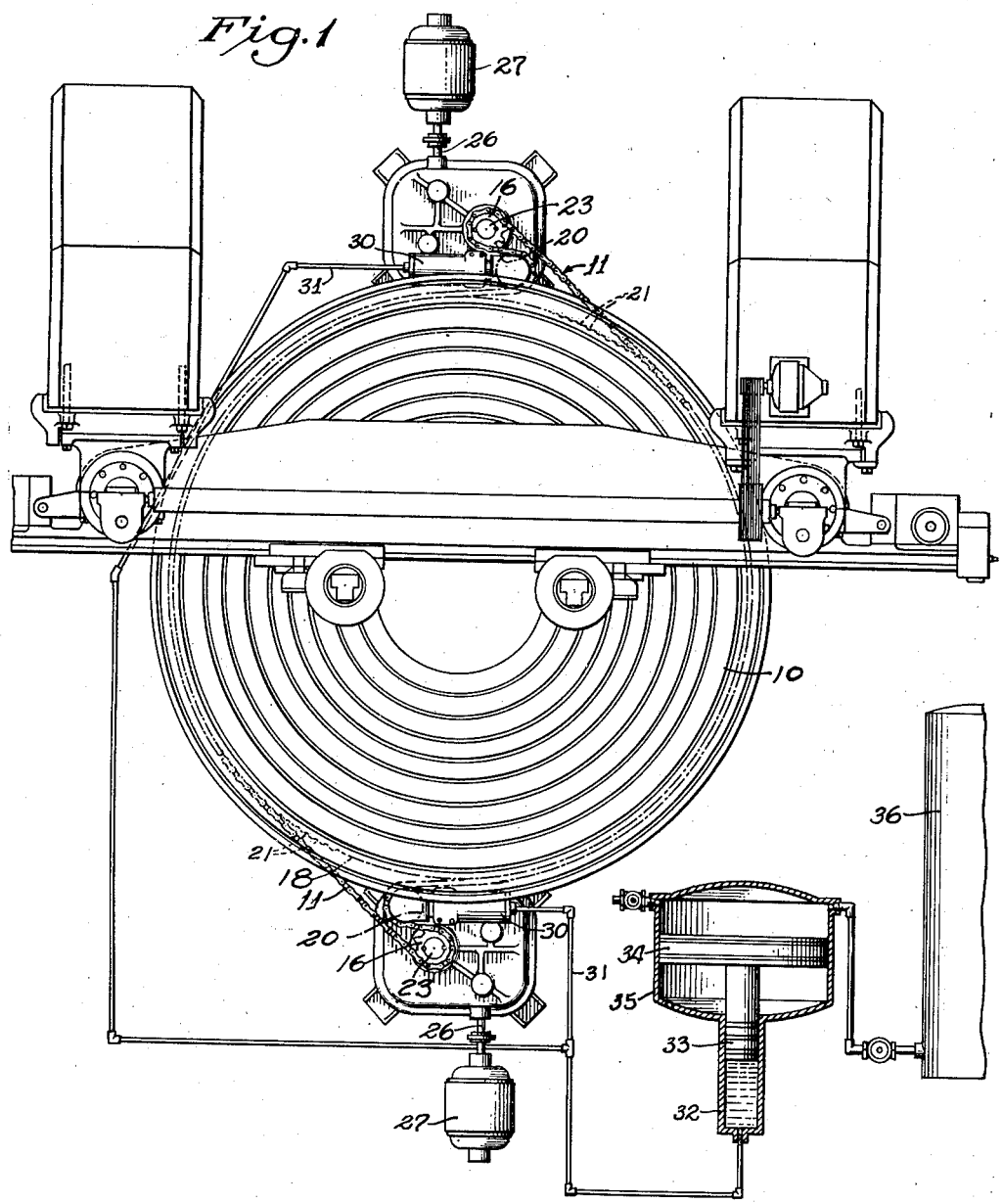

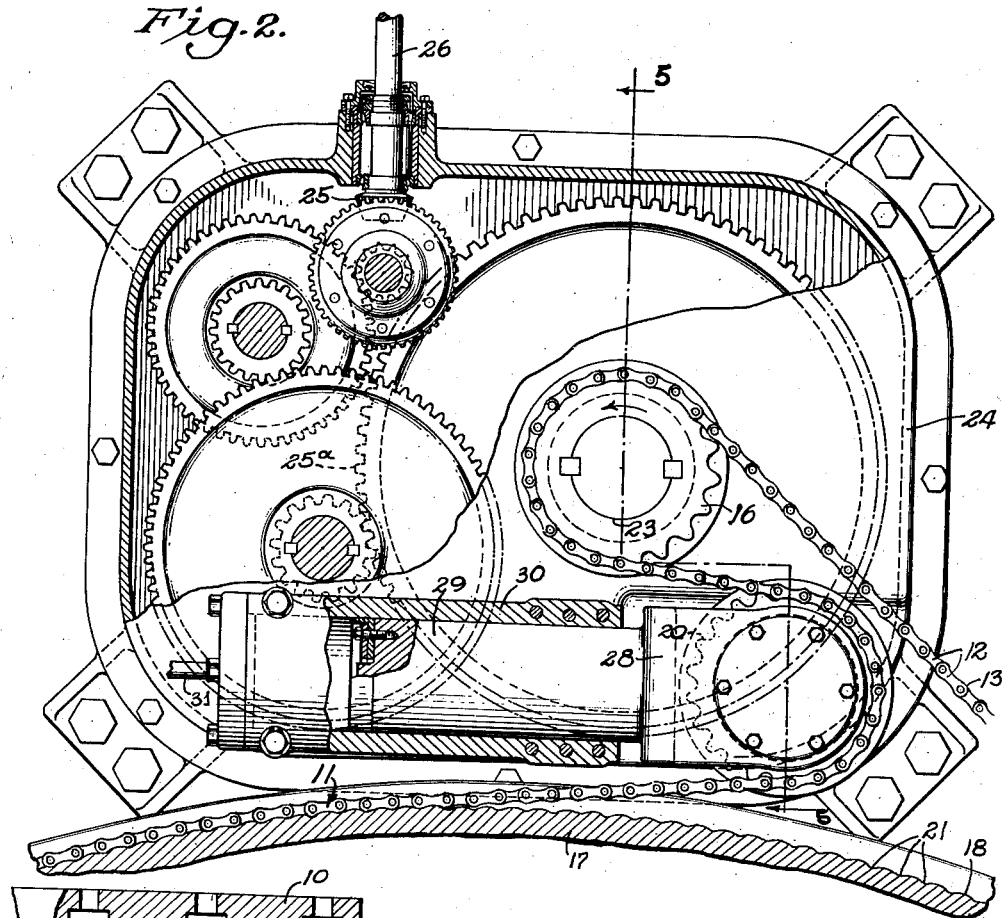

Patented Oct. 19, 1948

2,451,899

UNITED STATES PATENT OFFICE 2,451,899

TABLE DRIVE MECHANISM

Lucien I. Yeomans and De Witt Clausen, Chicago, Ill., assignors to Lucien I. Yeomans, Inc., Chicago, Ill., a corporation of Illinois Application December 26, 1942, Serial No. 470,262

5 Claims. (Cl. 74—221)

1

The invention relates to machine tools and more especially to large machines composed of separately constructed sections or units initially assembled at the place of use.

The general object is to provide a machine tool of this type having a rotary table and a drive mechanism therefor of a character such as to facilitate assembly of said mechanism with the table.

Another object is to provide a table drive mechanism comprising a self-contained power unit with a flexible drive between it and the table.

Still another object is to provide a novel chain drive for a rotary table, which is so constructed that the power of a plurality of driving members may be independently applied to the table through a single chain.

A further object is to provide a novel drive for a rotary table, utilizing a drive chain engaging an annular surface on the table, with said surface formed in such a manner as to provide a substantially positive driving engagement with the chain without the necessity of providing teeth on said surface.

A further object is to provide a table drive mechanism which is simple and relatively inexpensive in construction, and which transmits the driving force smoothly and more efficiently than the mechanisms heretofore used.

A more detailed object is to provide a table drive mechanism in which the driving force is applied to the table frictionally and at a maximum mechanical advantage to the outer periphery of the table.

Another object is to provide a novel chain drive.

A further object is to provide a chain type table drive having a novel means for tensioning the chain.

Other objects and advantages of the invention will become apparent from the following detailed description taken in connection with the accompanying drawings, in which Figure 1 is a plan view of a machine tool having a rotary table driven in accordance with the present invention.

Fig. 2 is a fragmentary plan view partially broken away of a portion of the drive gearing.

Fig. 3 is a vertical cross-sectional view of a portion of the table and its bed support.

Fig. 4 is a fragmentary cross-section taken along the line 4—4 of Fig. 3.

Fig. 5 is a broken cross-section taken along the line 5—5 of Fig. 2.

Fig. 6 is a front elevational view of the mechanism shown in Fig. 2.

2

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

In the drawings, the improved driving mechanism is illustrated as a drive for a horizontal circular table 10 of a machine tool such as a so-called vertical boring mill, the table being constructed and supported from a bed 9 in the manner disclosed in our copending application Serial No. 470,261, filed December 26, 1942 now Patent No. 2,415,269, February 4, 1947. In accordance with the present invention, power is applied positively to one or more endless metal chains 11 and transmitted frictionally over a large area of contact comprising substantially the entire circumference. Special means is provided to insure uniform and extremely firm gripping of the table over the entire area of contact.

Preferably, the chains are of standard construction having links each comprised of spaced parallel plates 12 overlapping each other at their enlarged rounded ends 13 and connected by pins 14 carrying spacers 15 that separate the plates. Power is transmitted to the chains positively by drive sprockets 16 meshing with the chain on opposite sides of the table and spaced from a depending flange 17 (Fig. 3) which is rigid with the table near the outer periphery thereof and provides a generally cylindrical external surface 18 engaged by the chains. The latter lie side by side and are supported by a horizontal ledge 19 on the flange 17. Each chain extends from one drive sprocket 16 tangentially to the surface 18, around the latter for nearly a half of its circumference, and then around an idler sprocket 20 and to the other drive sprocket 16. Thus, except for the short arcs between the table and the straight lengths of chain, the entire circumference of the surface 18 is gripped by each chain.

To provide for optimum gripping action, the surface 18 is roughened as by casting vertical grooves 21 therein, which grooves are shaped and spaced to receive the enlarged ends 13 of the chain links. With the chains properly tensioned, the link ends lie in these grooves as shown in Fig. 4 with the result that a substantially positive driving engagement is obtained without the necessity of providing the surface 18 with teeth.

Driving of the table 10 from its periphery, rather than at some more centrally located point, affords application of the driving power at the point of principal mechanical advantage or, in other words, results in driving "at the load" so to speak. A table of huge dimensions is contemplated, however, to accommodate the boring of such items as large pieces of ordnance. It will be appreciated by those skilled in the art that the cutting of teeth on large diameter gears or sprockets, that is of a diameter of say 20 or 40 feet, poses an extremely difficult problem in machining. Errors in tooth spacing being cumulative about the circumference of the gear or sprocket, even a minute error in location per tooth results in a completely unworkable error in location of teeth far along the series being cut. Even when sectionalized the gear of sprocket requires months to make with sufficiently accurate tooth spacing to insure smooth operation, and when completed is subject to inordinately large thermally induced changes in size because of its large overall dimensions. By using a frictional grip of the drive chain on the table periphery as described above, we have obviated the machining and other problems noted, thereby dispensing with both the expense and, even more important, the time otherwise consumed, so that even very large machines suitable for operating on huge castings for ordnance and the like can be fabricated in relatively short time. One of the prime requisites in designing the herein disclosed machine was to provide one that could be constructed in a matter of but a few weeks. It will be appreciated that even if the roughening grooves 21 alluded to above are used, they do not have to be located with an exactitude even approximating that required for sprocket or gear teeth. The actual contact of the drive chains 11 with the periphery of the table 10 is at the edges of the chain plates 12. There are no sprocket teeth or the like on the table to bear on the transverse chain rollers 15 so that the drive is frictional. The characterization of the engagement of the chain with the table as "frictional" is used herein, and in the claims appended hereto, to designate such an arrangement in which driving force is imparted from the chain to the table not by the rollers or other transverse chain members bearing on sprocket teeth or the like, but by inner peripheral portions of the chain held tightly against the opposed outer surface of the table in rubbing contact with it. Only in such an arrangement is the necessity for precision-spaced teeth on the table obviated.

The table drive herein shown is of a unitary character which lends itself particularly for use in a machine tool the various parts of which are separately constructed and initially assembled on a permanently located base or foundation at the place of use. Thus, the drive sprockets 16 are fast on the upper ends of shafts 23 journaled in gear boxes 24 which are disposed on opposite sides of the table and fastened rigidly on the table foundation. Within each box is a train of reduction gears (see Fig. 2) extending from a bevel drive pinion 25 to a gear 25ᵃ on the shaft 23. The pinion is on a shaft 26 journaled in a side wall of the gear box and driven by a reversible electric motor 27. It will be observed that the sole connection between each drive unit and the table is the chain which because of its flexible character does not necessitate the accurate alinement of the drive with the table that is required for the usual gear drive.

Provision is made for tensioning the chains so that they will be held in driving engagement with the surface 18 of the table without slippage. A tensioning force is applied to each idler sprocket 20 which is on a shaft supported in a yoke 28 whose end 29 (Fig. 2) constitutes a piston slidable in a horizontal cylinder 30. The latter is clamped against the top of the gear box 24 and its head end is connected through a pipe 31 with a source of pressure fluid. Herein, this source comprises a cylinder 32 and a piston 33 therein connected to a larger piston 34 which slides in a cylinder 35. Compressed air from a suitable source 36 is supplied to the head end of the cylinder 35 so that oil in the cylinder 32 and both cylinders 30 may be placed under the desired high pressure by air at a comparatively low pressure. Since the pipes 31 are both supplied from the same source, the pressures in the cylinders 30 are equalized as are the forces tensioning the chains at the two points. In operation, with the table driven counterclockwise as shown in Fig. 1, the idler sprocket 20 of each drive unit places tension on the portion of the chain extending in the direction of drive to the drive sprocket 16 of the opposite unit. Thus, such portion of the chain throughout its arc of contact with the table is held in driving engagement therewith and no slippage will occur. Moreover, since the driving engagement of the chain throughout such arc of contact is independent of the action of the chain in the opposite arc of contact, the driving force of each drive sprocket 16 is independently applied to the table. The arrangement is therefore such that the driving forces of a plurality of drive sprockets may be independently applied to the table through the medium of a single chain.

It will be apparent from the foregoing that with the chains arranged as above described to contact the major portion of the table circumference, it is possible to obtain sufficient gripping action to transmit the necessary power for rotating the table of a machine tool without danger of slippage. Accordingly, the drive thus provided is very simple and inexpensive in construction and yet durable and capable of withstanding severe usage encountered in machine tool operation.

We claim as our invention:

1. Mechanism for driving a rotary table comprising a linked chain, and means engaging said chain and positively driving the latter, said chain extending around a peripheral surface of said table and frictionally gripping the latter, said chain comprising a series of pivotally connected links each having side plates provided with enlarged ends and said table surface being formed with grooves spaced to receive said enlarged link ends.

2. Mechanism for driving a rotary table comprising a linked chain, and means engaging said chain and positively driving the latter, said chain extending around a peripheral surface of said table and frictionally gripping the latter, said table surface being grooved transversely of said chain to engage the edges of the links to increase the gripping action.

3. Mechanism for driving a rotary table comprising a chain, and means engaging said chain and positively driving the latter, said chain extending around a peripheral surface of said table and frictionally gripping the latter, said chain comprising a series of pivotally connected links and said table surface being contoured to conform to the contour of the links.

4. Mechanism for driving a rotary table comprising a power driven sprocket, a chain comprising an endless series of links meshing with said sprocket and positively driven by the latter, said chain extending around a peripheral surface of said table and frictionally gripping the surface over the major portion of its circumference, said surface being shaped to conform to the chain and thereby increase the gripping action of the chain, and means for tensioning the chain to maintain firm gripping engagement between the chain and said surface.

5. Mechanism for driving a rotary table comprising, in combination, a plurality of driving sprockets, a chain meshing with said sprockets and contacting the periphery of said table on a plurality of arcs, a plurality of tensioning members for holding the chain throughout its arcs of contact in frictional driving engagement with said table, and means for equalizing the tension applied to the chain by said tensioning members comprising hydraulic actuators, one for each tensioning member, and means for supplying pressure fluid to said actuators from a common source.

LUCIEN I. YEOMANS.
DE WITT CLAUSEN.

REFERENCES CITED

The following references are of record in the file of this patent:

UNITED STATES PATENTS

| Number | Name | Date |
|---|---|---|
| Re. 17,467 | Crawford | Oct. 22, 1921 |
| 231,071 | McKay | Aug. 10, 1880 |
| 350,464 | Manton | Oct. 5, 1886 |
| 649,064 | Lundin | May 8, 1900 |
| 1,156,446 | Taylor et al. | Oct. 12, 1915 |
| 1,204,451 | Kaveney | Nov. 14, 1916 |
| 1,249,346 | Dellamore | Dec. 11, 1917 |
| 1,376,123 | Stickel | Apr. 26, 1921 |
| 1,481,777 | Rosenfeld | Jan. 22, 1924 |
| 1,581,091 | Steward | Apr. 13, 1926 |
| 1,792,921 | Newhouse | Feb. 17, 1931 |
| 1,869,662 | Burkart et al. | Aug. 2, 1932 |
| 1,898,433 | Elle | Feb. 21, 1933 |
| 2,180,548 | Peterson | Nov. 21, 1939 |
| 2,221,585 | Klein et al. | Nov. 12, 1940 |